United States Patent

Takebayashi et al.

[11] Patent Number: 5,575,571
[45] Date of Patent: Nov. 19, 1996

[54] ROLLING BEARING

[75] Inventors: Hiroaki Takebayashi, Yao; Kazunori Hayashida, Sayama; Hisao Yabe, Hiratsuka; Isao Ikeda, Yokohama, all of Japan

[73] Assignee: Koyo Seiko Co., Ltd., Osaka, Japan

[21] Appl. No.: 464,816

[22] PCT Filed: Oct. 31, 1994

[86] PCT No.: PCT/JP94/01834

§ 371 Date: Aug. 25, 1995

§ 102(e) Date: Aug. 25, 1995

[87] PCT Pub. No.: WO95/12764

PCT Pub. Date: May 11, 1995

[30] Foreign Application Priority Data

Nov. 2, 1993 [JP] Japan .................................. 5-274029
Apr. 11, 1994 [JP] Japan .................................. 6-072164

[51] Int. Cl.⁶ ........................................................ F16C 33/56
[52] U.S. Cl. .................................... 384/492; 384/907.1
[58] Field of Search ............................ 384/492, 565, 384/569, 907, 907.1, 910

[56] References Cited

U.S. PATENT DOCUMENTS 4,522,453  6/1985  Lammer et al. ................... 384/907 X
4,792,244  12/1988  Yamashita et al. ............ 384/907.1 X
5,102,239  4/1992  Momose et al. ................. 384/907.1 X

FOREIGN PATENT DOCUMENTS 3106421   5/1988  Japan .................. 384/907.1
 220719   9/1989  Japan .................. 384/907.1
5-105506  4/1993  Japan .
5-117032  5/1993  Japan .
5-238829  9/1993  Japan .

*Primary Examiner*—Thomas R. Hannon
*Attorney, Agent, or Firm*—Popham Haik Schnobrich & Kaufman, Ltd.

[57] ABSTRACT

A rolling bearing in which rolling elements, alternatively, the rolling elements and a pair of races are made of a ceramic material prepared by sintering a sintering material of silicon nitride containing an $MgAl_2O_4$ of spinel structure and at least silicon oxide selected between silicon oxide and silicon carbide, as a sintering assistant.

Such a rolling bearing is excellent in heat resistance and wearing resistant, and presents superior corrosive resistance when it is used in a corrosive atmosphere, thus having a long service life.

12 Claims, 5 Drawing Sheets

ROLLING BEARING

TECHNICAL FIELD

This invention relates to rolling bearings and more particularly to rolling bearings wherein a rolling element, alternatively, a rolling element and a race are prepared from a ceramic material of silicon nitride.

BACKGROUND ART

As rolling bearings to be used under severe conditions such as high temperature, corrosive environment, vacuum or non-lubricant atmosphere in which normal metallic material cannot be used, there can mention so-called ceramic bearings wherein at least a rolling element (and more preferably, a rolling element and a race) is/are made of a ceramic material.

Such ceramic material preferred to use are those prepared by sintering a sintering material containing particles of silicon nitride($Si_3N_4$) because they are excellent in heat resistance and wear resistance.

Silicon nitride itself is, however, relatively poor in sintering properties. Therefore, to a sintering material, a variety of sintering assistants which improve sintering properties of the silicon nitride are generally added in each desired amount.

Examples of conventional sintering assistants include rare earth oxide such as yttrium oxide($Y_2O_3$), aluminum oxide ($Al_2O_3$) and aluminum nitride(AlN), among others.

As exemplary sintering material of silicone nitride containing the sintering assistants as described, those of $Si_3N_4$—$Y_2O_3$—$Al_2O_3$ or $Si_3N_4$—$Y_2O_3$—$Al_2O_3$—AlN are known in the art.

In the ceramic bearings prepared from the sintering material of silicon nitride, however, particularly sintering assistants and more particularly yttrium oxide is corroded when used in a corrosive atmosphere such as a strong acid atmosphere and a strong alkali atmosphere, reducing bonding strength between silicon nitride particles. This has been causing the problem that the strength of a ceramic bearing significantly reduces so that breakage occur before its design life.

It is accordingly the object of this invention to provide rolling bearings of a long service life, which are excellent in corrosion resistance when used under a corrosive atmosphere, as well as heat resistance and wear resistance.

DISCLOSURE OF THE INVENTION

The rolling bearing of this invention includes a pair of races and a plurality of rolling elements disposed between both races, at least the races being made of a ceramic material prepared by sintering a sintering material of silicon nitride containing an $MgAl_2O_4$ of spinel structure and at least silicon oxide selected between silicon oxide and silicon carbide, as a sintering assistant.

The rolling element, alternatively, the rolling element and the races both comprising such a ceramic material, are excellent in durability in a corrosive atmosphere, as well as heat resistance and wear resistance.

Thus this invention can provide rolling bearings being excellent in wear resistance, corrosion resistance in a corrosive atmosphere, and of a long service life.

PREFERRED EMBODIMENT OF THE INVENTION

Figure 1A:
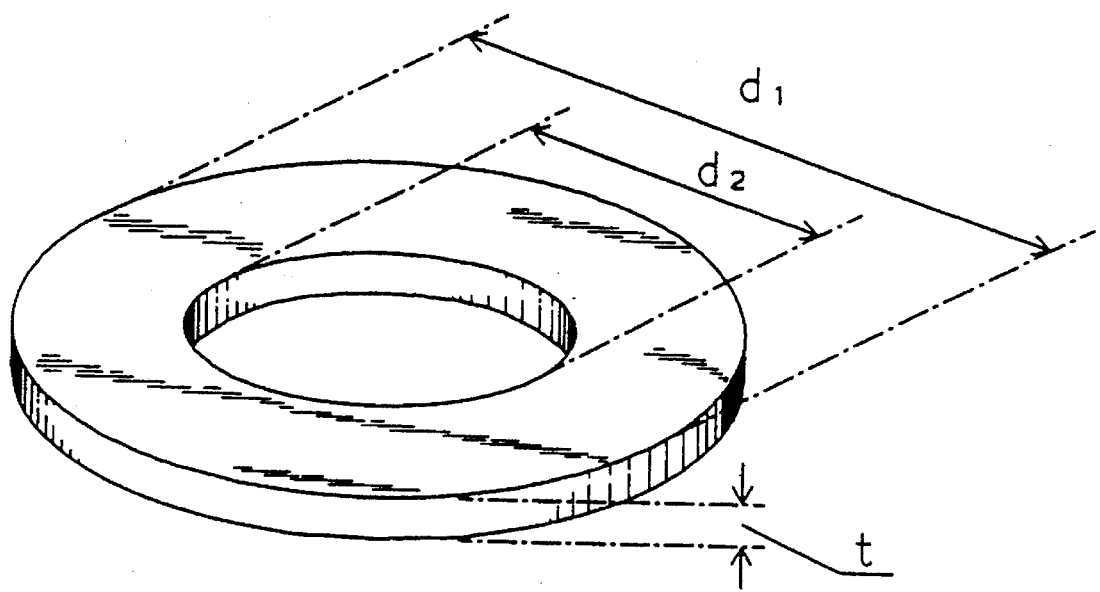
FIG. 1(a) is a perspective view illustrating appearance of a disc test piece for thrust test, which was prepared from a sintering material (Samples Nos. 1–3), in order to evaluate properties of the ceramic material for the rolling bearings of this invention and those of ceramic material for conventional ceramic bearings (Samples Nos. 4–5).

In this invention, at least the rolling elements are made of a ceramic material prepared by sintering a sintering material of silicon nitride containing an $MgAl_2O_4$ of spinel structure and at least silicon oxide selected between silicon oxide and silicon carbide, as a sintering assistant.

As the silicon nitride($Si_3N_4$), there may use a variety of crystal systems such as α-type, β-type, etc. where the α-type is preferred. Although no limitation is imposed to particle diameter of the silicon nitride when it is in the state of sintering material, namely, prior to sintering, its mean particle diameter preferably ranges from about 0.4 to about 1.5 μm in order to form a denser sintered body.

Of sintering assistants, the $MgAl_2O_4$ of spinel structure links silicon nitride particles at the time of sintering to make a sintered structure denser, which is its major role, and it also acts to improve corrosion resistance of the ceramic material by forming a grain boundary phase that exhibits strong resistance, especially to strong acid or strong alkali, with the aid of silicon nitride particles.

Silicon oxide strengthens the linkage between the silicone nitride particles and sintering assistants such as an $MgAl_2O_4$ of spinel structure, so that corrosion resistance of the ceramic material increases further.

Silicon carbide assists an $MgAl_2O_4$ of spinel structure to improve corrosion resistance of the ceramic material, and also contributes to the improvement in mechanical properties of the ceramic material, particularly to its hardness, thus improving its rigidity. In addition, the silicon carbide reduces frictional resistance of the ceramic material to improve its surface lubricity.

In this invention, it is possible to use other sintering assistants unless they affect on the actions of the compounds as described.

As examples of such sintering assistants, without being limited thereto, there can mention oxides such as titanium oxide, hafnium oxide and tungsten oxide; carbides such as titanium carbide, hafnium carbide and tungsten carbide, among others.

The exemplified sintering assistants act in combination with an $MgAl_2O_4$ of spinel structure to promote densification, i.e., a sintering accelerator. In addition, they change, within a ceramic material, to independent particles whose melting point is higher than a sintered ceramic material, and then such particles disperse into the ceramic material structure to improve strength and wearing resistance of the ceramic material. Among those, titanium oxide also functions as black coloring agent.

Although the proportion of the individual sintering assistant is not limited in this invention, that of an $MgAl_2O_4$ of spinel structure to the total weight of sintering material preferably ranges from 0.5 to 6% by weight where from 2 to 5% by weight is preferred and near 3.5% by weight is most preferred. If it is less than 0.5% by weight, titanium nitride would fail to dense the sintered structure, lowering heat resistance and wearing resistance of the ceramic material. Conversely, if it exceeds 6% by weight, corrosion resistance of the ceramic material might reduce.

The proportion of silicon oxide preferably ranges from 0.1 to 1% by weight where near 0.5% by weight is preferred. If it is less than 0.1% by weight, the blending effect would be insufficient, failing to obtain satisfactory improvement in corrosion resistance of the ceramic material. Conversely, if it exceeds 1% by weight, sintering properties might be inhibited.

Silicon carbide may be employed but is not required, whose lower limit is not defined up to 0% by weight. When blending silicon carbide, its proportion preferably ranges from 3 to 5% by weight where 5% by weight is preferred. If it is less than 3% by weight, the blending effect would be insufficient, failing to improve mechanical properties nor reduce frictional resistance. Conversely, if it exceeds 5% by weight, sintering properties might be inhibited.

Each proportion of other sintering assistants than those described above preferably ranges from 0 to 1% by weight. If it exceeds 1% by weight, corrosion resistance of the ceramic material might reduce.

Although the entire amount of the sintering assistants mentioned above is not particularly limited in this invention, the system containing no silicon carbide is preferably present in a range of from 3 to 6% by weight whereas the system containing silicon carbide is preferably present in a range of from 6 to 11% by weight. For either case, if the entire amount of the sintering assistants is less than each lower limit mentioned above, the blending effect of the sintering assistants would be insufficient, failing to obtain satisfactory improvement in corrosion resistance of the ceramic material. On the other hand, if it exceeds each upper limit, heat resistance and wearing resistance of the ceramic material might reduce.

Sintering material for the system containing no silicon carbide has the advantage that an altered layer in the surface of a sintered ceramic material would become small in amount, so that such a sintering material is excellent in cost performance and is suitable for rolling bearings for general purpose use.

On the other hand, when using a system containing silicon carbide, although such an altered layer would become larger in amount than the former system, a sintered ceramic material performs its self-lubricating properties owing to frictional resistance reducing action derived from the silicon carbide. This system is, therefore, suitable for rolling bearings to be used in a non-lubricant condition prohibiting the use of lubricants such as grease.

The increase of altered layer when sintering the latter system may be caused by the following matter. Specifically, a complete sintering of silicon carbide requires the sintering temperature of 2000° C. or more, whereas silicon nitride can generally be sintered at about 1800°–1850° C. Therefore, when sintering the sintering material of the latter system at about 1800°–1850° C., the sintering of silicon carbide tends to be incomplete, increasing altered layer.

The rolling bearings of this invention include a pair of the races and a plurality of the rolling elements provided between both races, at least the rolling elements being prepared from the ceramic material made of the specific composition, as previously mentioned. Specifically, the rolling bearings of this invention fall into two types, as follows:

(I) One wherein only the rolling elements are prepared from the specific ceramic material; and (II) One wherein both of the rolling elements and the races are prepared from the specific ceramic material.

The rolling bearing of the type (II) is particularly excellent in heat resistance, wearing resistance and corrosion resistance. Depending upon performance or use, however, the rolling bearing of the type (I) may also be usable.

In the cases where only the rolling elements are prepared from the specific ceramic material, the races are preferably made of a variety of conventional material for race, such as stainless steel(SUS440C).

For both types of rolling bearings, it is desirable to have a retainer for holding the rolling elements. An appropriate retainer for a rolling bearing to be used in a non-lubricant atmosphere is one whose surface itself is excellent in self-lubricating properties. Examples of such a retainer include one whose entire surfaces are made of fluorocarbon polymers, and one prepared from stainless steel(SUS304) whose entire surfaces are being covered with baking film of fluorocarbon polymers.

In order to prepare the rolling element or the race from the specific ceramic material, there can employ normal ceramics molding and sintering techniques, such as the method wherein each given amount of the ingredients as described are blended to prepare a sintering material, which is then molded into a specific shape by mold press or the like, and the molding is sintered in an inert gas atmosphere for a predetermined period of time. As sintering technique, there can employ any of well-known methods such as hot pressing(HP), atmosphere pressurization and hot isostatic pressing(HIP).

INDUSTRIAL APPLICABILITY

As discussed in the foregoing, the rolling bearings of this invention have excellent durability and corrosive resistance when using in a corrosive atmosphere, as well as heat resistance and wearing resistance. Thus they are well suited for applications under the severe conditions such as high temperature, corrosive atmosphere, vacuum and non-lubricated atmosphere in which normal metal cannot be used.

PREPARATION OF SAMPLES

Samples Nos. 1 to 3

As an example of a ceramic material for the rolling bearing of this invention, α-type silicon nitride whose mean particle diameter is 0.7 μm and each given amount of sintering assistants illustrated in Table 1 were blended to prepare a mixture, to which ethanol was added as a solvent and agitated by a ball mill for 48 hours. There obtained each sintering material of silicone nitride (Samples 1 to 3).

TABLE 1

|  |  | Sample No. | | |
| --- | --- | --- | --- | --- |
|  |  | 1 | 2 | 3 |
| $Si_3N_4$ (% by weight) |  | 95 | 91 | 90 |
| Sintering | $MgAl_2O_4$ | 3.5 | 3.5 | 3.5 |
| Assistants | $SiO_2$ | 0.5 | 0.5 | 0.5 |
| (% by weight) | SiC | — | 5 | 5 |
|  | $TiO_2$ | 1 | — | 1 |
|  | Subtotal | 5 | 9 | 10 |

Sample Nos. 4 and 5

As an example of a ceramic material for conventional bearings, an α-type silicon nitride whose mean particle diameter is 0.7 μm and each given amount of sintering assistants illustrated in Table 2 were blended to prepare a mixture, to which ethanol was added as a solvent and agitated by a ball mill for 48 hours. There obtained each sintering material of silicone nitride (Samples 4 and 5).

TABLE 2

|  |  | Sample No. | |
| --- | --- | --- | --- |
|  |  | 4 | 5 |
| $Si_3N_4$ (% by weight) |  | 87 | 95 |
| Sintering | $Al_2O_3$ | 4.5 | 2 |
| Assitants | $Y_2O_3$ | 5.5 | 1.5 |
| (% by weight) | $TiO_2$ | 1 | 0.5 |
|  | AlN | 2 | 1 |
|  | Subtotal | 13 | 5 |

PREPARATION OF TEST PIECES

Disc Test Pieces

To each sintering material(Samples Nos. 1–5), the fixed amount of organic binder was added with stirring to prepare a mixture. The mixture was subjected to pressure molding with a molding pressure of 1000 kgf/cm² to obtain a molding. The molding was degreased in a nitrogen gas atmosphere raised to 500° C. and further subjected to sintering at atmospheric pressure in a nitrogen gas atmosphere raised to 1800° C. for 2 hours. Prepared were disc test pieces for thrust test (60 mm in diameter $d_1$, 25 mm in diameter of the center hole $d_2$, 5 mm in thickness t), as shown in FIG. 1(a).

Stick Test Pieces

Figure 1B:
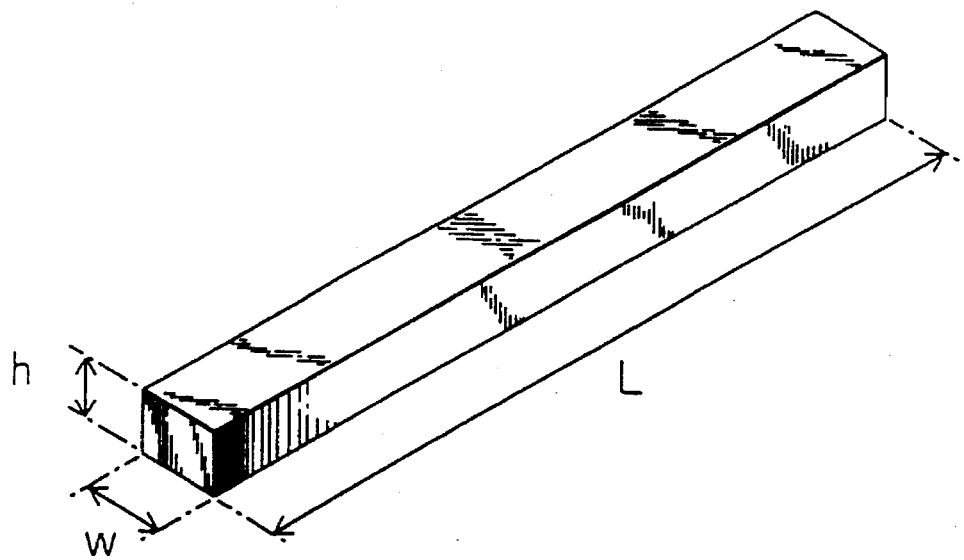
FIG. 1(b) is a perspective view illustrating appearance of a stick test piece for strength test, which was prepared from a sintering material out of Samples Nos. 1–5.

The above steps were repeated to prepare stick test pieces for flexural strength test (3 mm in height h, 4 mm in width w, 40 mm in length L), as shown in FIG. 1(b).

TESTS

Physical Properties Test

Physical properties such as density(g/cm³), Vickers hardness Hv, flexural strength(kgf/mm²) and fracture toughness Klc(MPam$^{1/2}$) for each stick test piece was determined in the usual way.

Measurement of Altered Layer

Each test piece was observed by a microscope to determine the thickness of altered layer in its surface. Table 3 gives the results.

TABLE 3

| Sample No. | Density (g/cm³) | Vickers hardness (Hv) | Flexural strength (kgf/mm²) | Fracture toughness (MPam$^{1/2}$) | Thickness of altered layer (mm) |
| --- | --- | --- | --- | --- | --- |
| 1 | 3.16–3.18 | 1490–1500 | 111 | 6.2–6.4 | near 0.2 |
| 2 | 3.16–3.18 | 1510–1550 | 96 | 6.5–6.7 | near 0.3 |
| 3 | 3.16–3.18 | 1480–1540 | 107 | 6.4–6.6 | near 0.3 |
| 4 | 3.22–3.24 | 1420–1490 | 115 | 6.5–6.9 | near 0.3 |
| 5 | 3.17–3.19 | 1510–1610 | 76 | 5.4–5.6 | near 0.3 |

Acid Dipping Test

Each disc test piece for thrust test as shown in FIG. 1(a) was dipped in a 35% solution of hydrochloric acid raised to 80° C. and was allowed to stand for 100 hours. Then, weight lapse rate was obtained according to the equation:

$$\frac{\text{(weight before dipping)} - \text{(weight after dipping)}}{\text{(weight before dipping)}} \times 100$$

Figure 2:
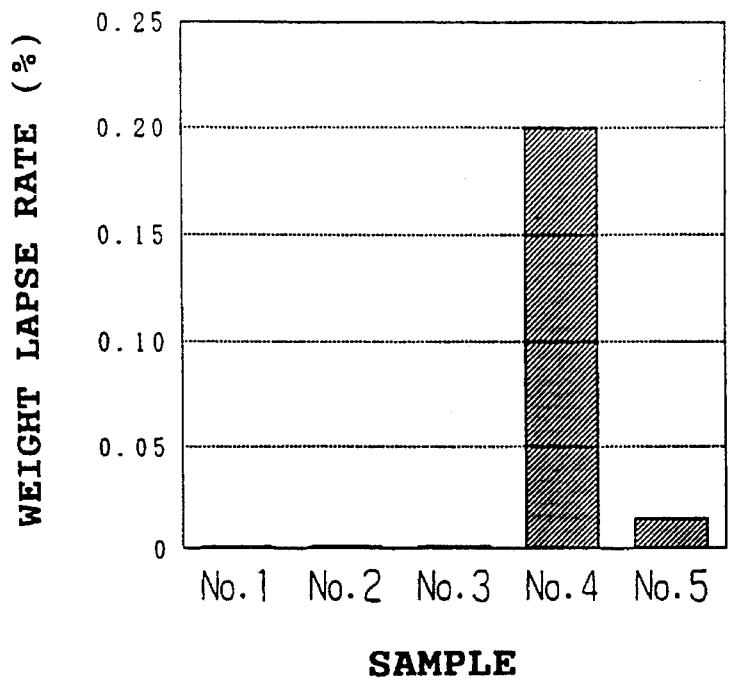
FIG. 2 is a graph illustrating weight lapse rate (%) of the disc test piece when conducting an acid dipping test wherein the disc test piece was dipped in acid to make it be corroded.

FIG. 2 and Table 4 give the test results.

It can be seen that every disc test piece made of a ceramic material prepared by sintering Sample 1, 2 or 3, had a very small weight lapse rate compared with that using Sample No. 4 or 5.

Flexural Strength Test I

Figure 3:
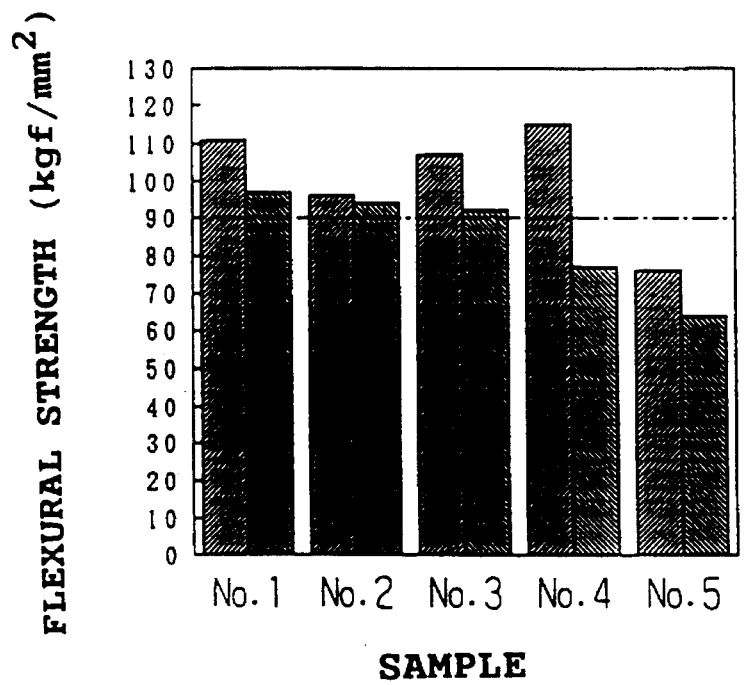
FIG. 3 is a graph illustrating the transition of flexural strength before and after conducting the acid dipping test for the stick test piece.

For each test piece for flexural strength test as shown in FIG. 1(b), the same acid dipping test was conducted to determine its flexural strength. FIG. 3 and Table 4 give the test results accompanying the corresponding results before the acid dipping test. In FIG. 3, the left and right bar graphs for each Sample show flexural strength obtained before and after the acid dipping test, respectively.

It can be seen that the test piece using Sample 5 did not attain the desired value of 90 kgf/mm² even before the acid dipping test, whereas that using Sample 4 had the desired value (not less than 90 kgf/mm²) before the test, but after the test, the flexural strength fell below the desired value due to significant drop.

In contrast to this, the flexural strength for every test piece using Sample 1, 2 or 3, was in above the desired value before the test, and so it was even after the test although a slight drop occurred.

Rolling Life Test after the acid dipping test

Figure 4A:
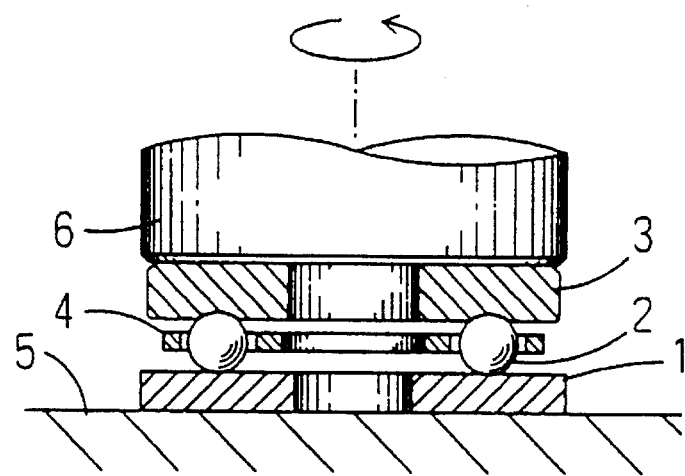
FIG. 4(a) is a sectional view illustrating the outline of a device used in a rolling life test for the disc test piece.

As shown in FIG. 4(a), there prepared a sample wherein the combination of three pieces of ball 2 for bearing (⅜ inch in diameter, made of bearing steel SUJ2), a race 3 made of bearing steel SUJ2 and a retainer 4 made of brass was placed on the disc test piece 1 for thrust test which had been used in the acid dipping test. The sample thus prepared was mounted on a disc 5 of a device for thrust test and was rotated in the direction illustrated by an arrow while loading a load to the race 3 through a load axis 6. Setting the upper limit of rotation time to 400 hours, the life of the disc test piece 1 was defined as the moment when a vibrometer installed in the device indicated a value exceeding the fixed value. There also observed the rolling contact surface in the disc test piece 1 after the rolling life test.

Test Conditions

Figure 4B:
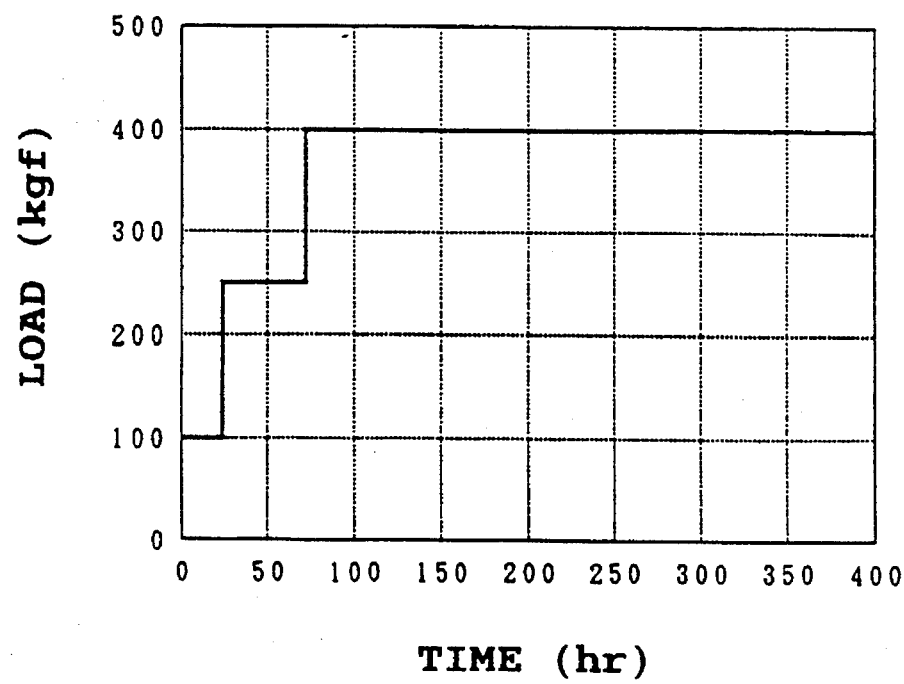
FIG. 4(b) is a graph illustrating the load transition when conducting the rolling life test using the device of FIG. 4(a)
Figure 5:
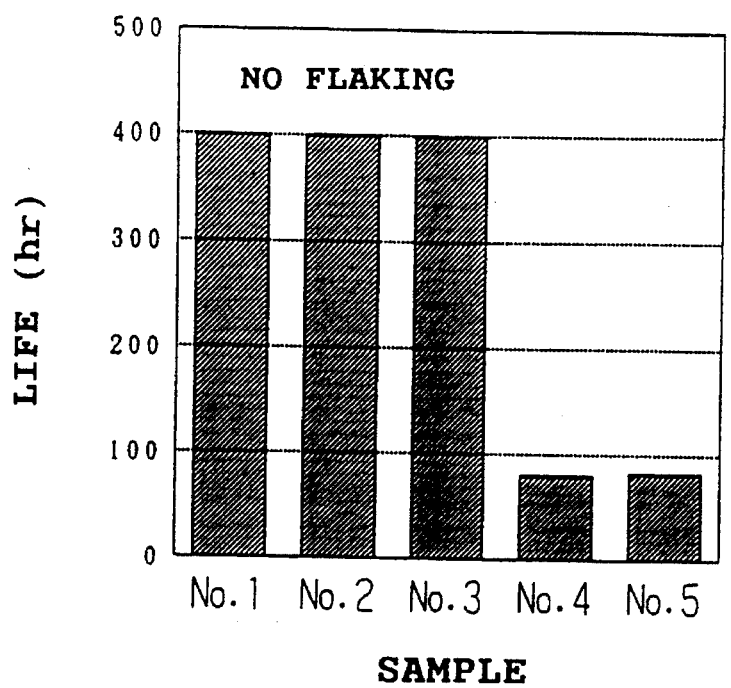
FIG. 5 is a graph illustrating the rolling life of the disc test piece, which was obtained after conducting the acid dipping test using the device shown in FIG. 4(a).

Lubricating Oil: Spindle oil #60
Load: It was increased gradually as shown in FIG. 4(b), that is, 100 kgf for 24 hours; 250 kgf for 48 hours; 400 kgf for 328 hours: totaled 400 hours
Rotation Speed: 1200 r.p.m.
Testing Time : Max. 400 hours
FIG. 5 and Table 4 give the test results.

It can be seen that every disc test piece using Sample 4 or 5 was broken in less than 100 hours due to wear accompanied by peeling over the entire rolling contact surface. In contrast to this, every disc test piece using Sample 1, 2, or 3 had no peeling on its rolling contact surface even after 400-hour test, retaining sufficient strength after the acid dipping test.

| Sample No. | Weight lapse rate (%) | Flexural strength (kfg/mm$^2$) Before dipping | After dipping | Life (hr) | Conditions of rolling contact surface |
| --- | --- | --- | --- | --- | --- |
| 1 | slight | 111 | 97 | 400 no flaking | Good |
| 2 | slight | 96 | 94 | 400 no flaking | Good |
| 3 | slight | 107 | 92 | 400 no flaking | Good |
| 4 | 0.2 | 115 | 77 | 81.0 | Entire wear (peeling) |
| 5 | 0.015 | 76 | 64 | 82.8 | Entire wear (peeling) |

Alkali Dipping Test

Each disc test piece similar to that used in the acid dipping test was dipped in a 35% solution of potassium hydroxide raised to 80° C. and was allowed to stand 100 hours. There obtained weight lapse rate (%) according to the equation:

$$\frac{\text{(weight before dipping)} - \text{(weight after dipping)}}{\text{(weight before dipping)}} \times 100$$

Figure 6:
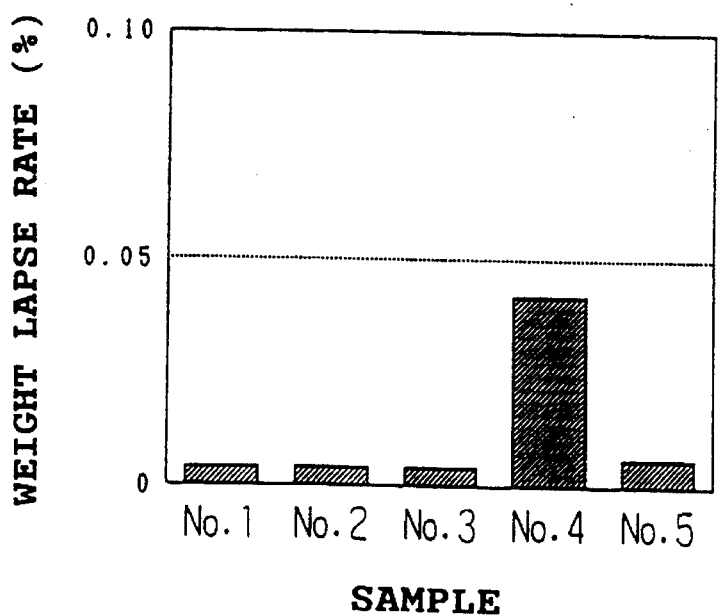
FIG. 6 is a graph illustrating weight lapse rate (%) of the disc test piece when conducting the alkali dipping test wherein the disc test piece was dipped in alkali to make it be corroded.

FIG. 6 and Table 5 give the test results.

It can be seen that every weight lapse rate for the disc test piece using Sample 1, 2 or 3, was extremely smaller than that using Sample 4 or 5.

Flexural Strength Test II

Figure 7:
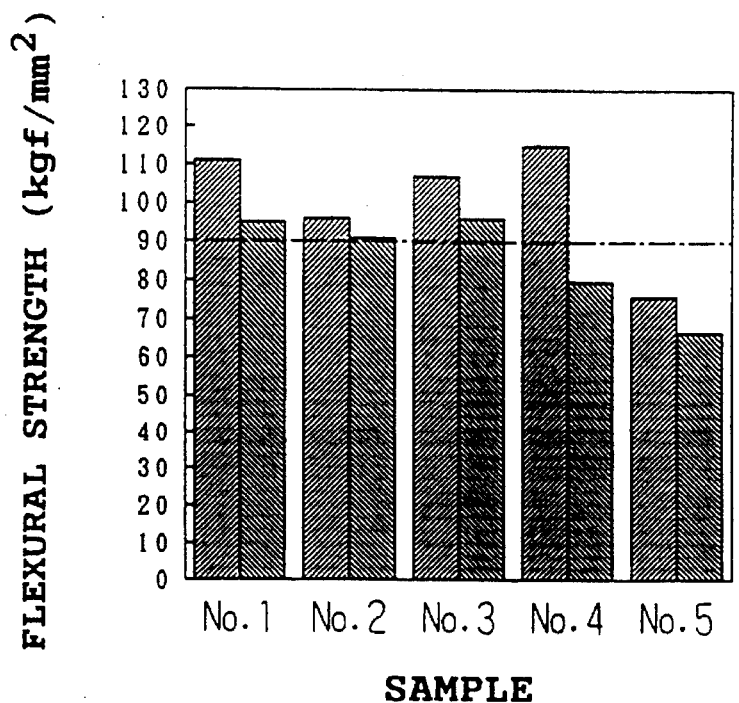
FIG. 7 is a graph illustrating the transition of flexural strength between before and after conducting the alkali dipping test for the stick test piece.

Using similar disc test pieces used in the previous flexural strength test, another alkali dipping test was conducted under the same conditions in the foregoing to determine each flexural strength. FIG. 7 and Table 5 give the test results accompanying the corresponding results before the alkali dipping test. In FIG. 7, the left and right bar graphs for each Sample show flexural strength obtained before and after the alkali dipping test, respectively.

It can be seen that the flexural strength for the test piece using Sample 5 was less than the desired value of 90 kgf/mm$^2$ even before the alkali dipping test. On the other hand, that of the test piece using Sample 4 exceeded the desired value of not less than 90 kgf/mm$^2$ but after the alkali dipping test, it fell below the desired value due to significant drop.

In contrast to this, the flexural strength for the test piece using Sample 1, 2 or 3 was in above the desired value, and so it was even after the alkali dipping test although a slight drop occurred.

Rolling Life Test after Alkali Dipping Test

Figure 8:
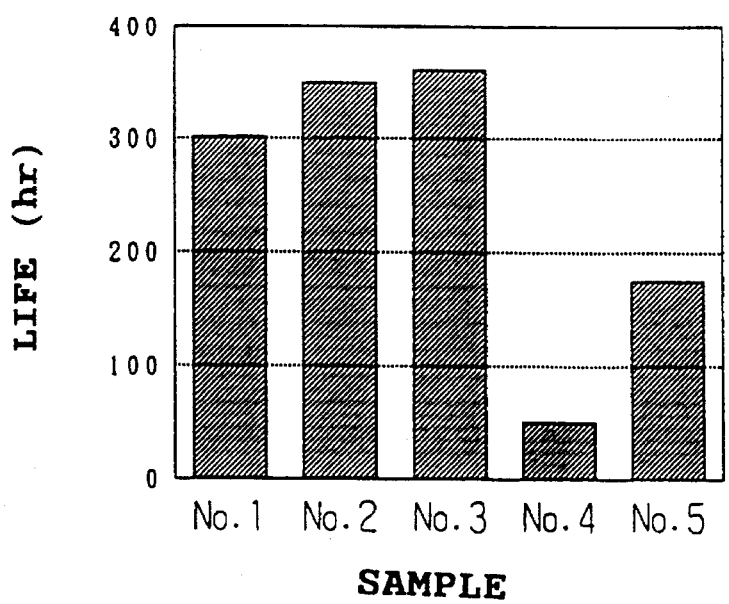
FIG. 8 is a graph illustrating the rolling life of the disc test piece, which was obtained after conducting the alkali dipping test using the device shown in FIG. 4(a).

Using the device illustrated in FIG. 4(a), there determined rolling life for each disc test piece after the alkali dipping test under the same conditions as described in the rolling life test after the acid dipping test. There also observed the rolling contact surface in each disc test piece after the alkali dipping test. FIG. 8 and Table 5 give the test results.

It can be seen that every disc test piece using Sample 4 or 5 was broken in less than 200 hours, whereas that using Sample 1, 2 or 3 had life over 300 hours and also exhibited sufficient strength after the alkali dipping test.

TABLE 5

| Sample No. | Weight lapse rate (%) | Flexural strength (kfg/mm$^2$) Before dipping | After dipping | Life (hr) | Conditions of rolling contact surface |
| --- | --- | --- | --- | --- | --- |
| 1 | 0.004 | 111 | 95 | 301.5 | Wearing-out (peeling) |
| 2 | 0.004 | 96 | 91 | 349.1 | Wearing-out (peeling) |
| 3 | 0.004 | 107 | 96 | 361.0 | Wearing-out (peeling) |
| 4 | 0.042 | 115 | 80 | 50.5 | Wearing-out (peeling) |
| 5 | 0.006 | 76 | 67 | 175.2 | Wearing-out (peeling) |

EXAMPLES

Example 1

Using the sintering material of Sample 3, an inner and an outer rings and a ball for a radial ball bearing corresponding to Reference No. 6206 defined in Japanese Industrial Standard(JIS) were prepared and combined with a retainer made of polytetrafluoroethylene to obtain a bearing, which was then continuously rotated in an atmosphere of a 10% hydrochloric acid and a 30% nitric acid with a radial load of 5 kg at a rotation speed of 10 r.p.m. As a result, there confirmed that it had been satisfactorily rotating over 4000 hours.

COMPARATIVE EXAMPLE 1

The steps in Example 1 was repeated except the use of Sample 4.

As a result, there confirmed that a gap between the bearing became greater in 4000 hours, failing to serve as a bearing.

We claim:

1. A rolling bearing comprising a pair of races and a plurality of rolling elements provided between both races, wherein at least the rolling elements ar made of a ceramic material prepared by sintering a sintering material of silicon nitride containing an $MgAl_2O_4$ of spinel structure and silicon dioxide as sintering assistants.

2. The rolling bearing according to claim 1, wherein the sintering material contains α-type silicon nitride.

3. The rolling bearing according to claim 1, wherein the sintering material contains silicon nitride whose mean particle diameter ranges from 0.4 μm to 1.5 μm.

4. The rolling bearing according to claim 1, wherein the $MgAl_2O_4$ of spinel structure is present in a range of from 0.5% to 6% by weight based on the total amount of the sintering material.

5. The rolling bearing according to claim 1, wherein silicon dioxide is present in a range of from 0.1% to 1% by weight based on the total amount of the sintering material.

6. The rolling bearing according to claim 1, wherein the sintering assistants are present in a range of from 3% to 6% by weight based on the total amount of the sintering material.

7. The rolling bearing according to claim 1, further comprising a retainer for holding the rolling element, the retainer being simply made of fluorocarbon polymers, alternatively, the retainer surfaces being entirely covered with a film made of fluorocarbon polymers.

8. The rolling bearing according to claim 1, wherein the sintering material further comprises silicon carbide as a sintering assistant.

9. The rolling bearing according to claim 8, wherein silicon carbide is present in a range of from 3% to 5% by weight based on the total amount of the sintering material.

10. The rolling bearing according to claim 8, wherein the sintering assistants are present in an amount of from 6% to 11% by weight based on the total amount of the sintering material.

11. The rolling bearing according to claim 1, wherein the sintering material further comprises at least one additional sintering assistant selected from the group consisting of titanium oxide, hafnium oxide, tungsten oxide, titanium carbide, hafnium carbide, and tungsten carbide.

12. The rolling bearing according to claim 11, wherein the additional sintering assistants are present in not more than 1% by weight based on the total amount of the sintering material.

* * * * *